Patented June 12, 1928.

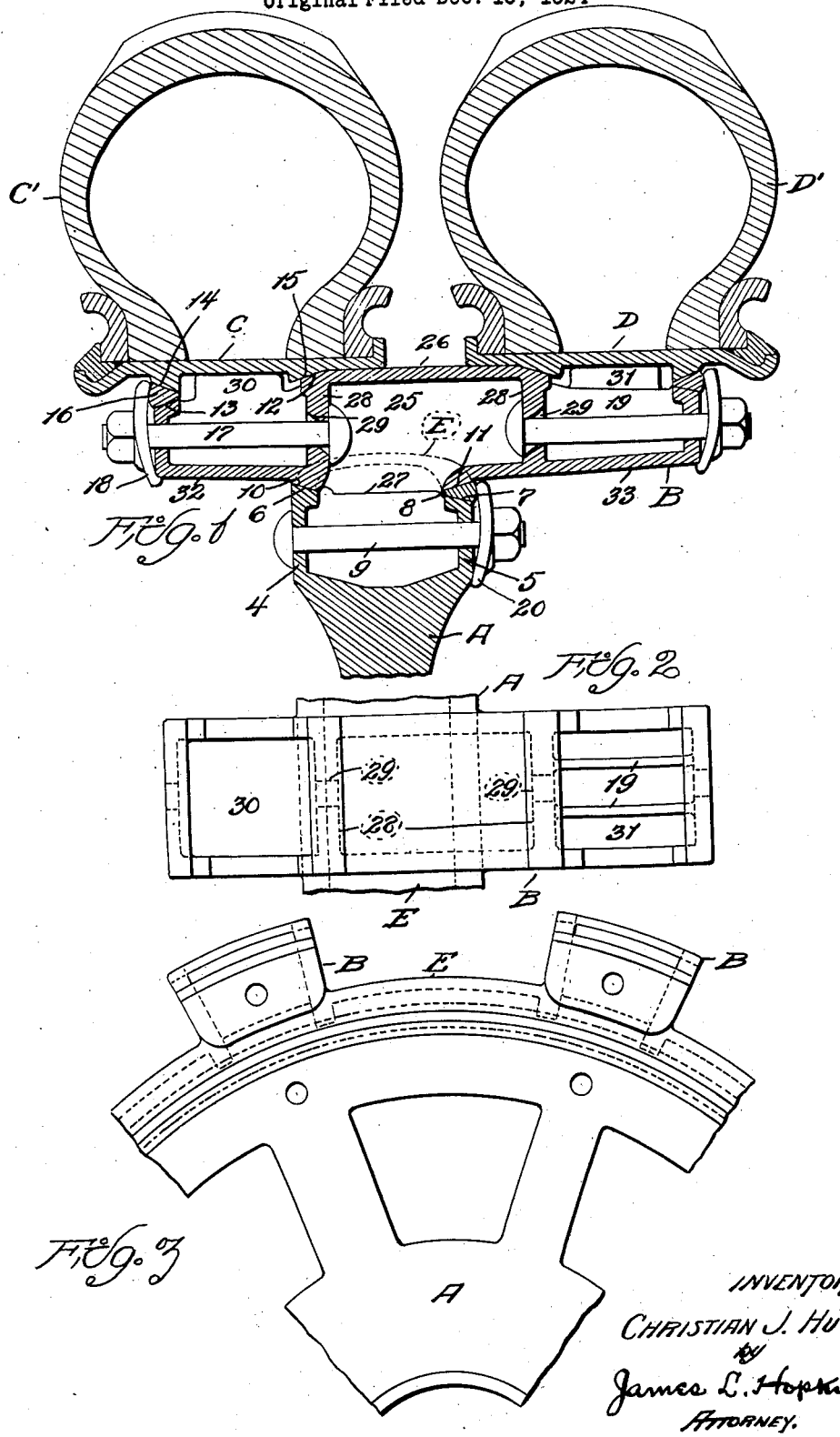

UNITED STATES PATENT OFFICE.

CHRISTIAN J. HUG, OF HIGHLAND, ILLINOIS.

VEHICLE WHEEL.

Application filed December 15, 1924, Serial No. 755,911. Renewed April 25, 1928.

My invention relates to improvements in vehicle wheels, and has for its object to provide a wheel having a single (pneumatic or solid resilient) tire, and also having an auxiliary twin-tire carrier, whereby said wheel may be converted at will from a single tired wheel of smaller diameter to a dual-tired wheel of larger diameter, and vice versa.

While the wheel of my invention may be used upon any wheel-supported vehicle, it is especially useful upon motor trucks used upon roads of various hard and soft surfaces. In road-building service, for example, the single tire is admirably adapted for travel upon a finished road-bed, but under loaded conditions may work substantial injury upon soft and unfinished sub-grade, for use upon which the dual tire is therefore desirable. In such road-building service the change from the single tire to the twin-tire is not only desirable, but should be quickly effected when necessary. It is the object of my invention to permit the changes to be made from single-tire to dual-tire, and back to single-tire, quickly and by the use of but few connecting elements, and without disturbance of any part of the wheel structure except the inner tire-rim, and the outer tire-rim carrier. So, also, in any change of operation of the vehicle from muddy, loose or sandy surfaces to hard finished road-beds. The change of tread-surface may be desired and may quickly be effected where the wheel of my invention is employed.

Drawings.

In the drawings—

Fig. 1 is a transverse sectional view of the outer portion of a wheel embodying my invention.

Fig. 2 is a top plan view of one of the brackets employed in the carrier.

Fig. 3 is a fragmentary side elevation of a wheel and carrier embodied in my invention.

Description.

In the drawings the wheel A is provided with peripheral flanges 4 and 5, having respectively the outer beveled edges 6 and 7, arranged for the reception of a standard single-tire rim, which rim when seated is held in place by means of the wedge 8, bolt 9 and washer 20. To adapt said wheel A for the reception of the dual tires I provide a bracket B formed as shown in Fig. 1, being provided at its bottom with the beveled edges 10 and 11, arranged to be seated respectively in contact with the beveled edge 6 and the wedge 8, and to be held in place by the bolt 9. The bracket B will be so constructed as to hold an inner rim C and an outer rim D in the relative positions indicated in Figs. 1 and 2; said rims C and D are so mounted in order to provide clearance between the tire C' and the adjacent side of the vehicle whereon the wheel A is mounted.

The bracket B is provided, beneath the rim C with the beveled edges 12 and 13 to correspond with the inwardly extending beveled edges 14 and 15 of the rim C, rim C when mounted in position being held in place upon the carrier B by means of the wedge 16, bolt 17 and washer 18.

The outer rim D is similarly mounted upon the outer portion of the bracket B; said outer portion of the bracket B being preferably reinforced against the strains to which it is subjected by reason of being outside of the plane of the wheel A, by means of the reinforcing ribs 19. The brackets B are preferably eight or more in number, and are equidistantly mounted upon and connected by the annulus E.

The mounting of the twin tires C' and D' upon their respective rims C and D is effected in any manner desired, as the carrier consisting of the brackets B and annulus E is intended to receive and have mounted thereon any desired type of rim, and tire carried by such rim, whether said tire be solid or pneumatic.

The carrier-bracket B is formed to permit the rims C D to be readily mounted in place. Thus I have provided a central chamber 25, closed at its top by the web 26 and having the open-mouthed bottom 27, and side-walls 28—28 provided with perforations 29 formed as shown in section in Fig. 1, so that the bolts 17 may be inserted in place through the open-mouthed bottom 27. The side chambers 30 and 31 have the closed bottoms 32 and 33 respectively and are open at their tops to receive the tire-rims C and D.

As indicated in Fig. 5 the series of brackets B is so arranged upon the annulus E that the brackets B are equi-distant from each other. Their number will be varied according to the wheel-diameter and the load to be carried. It will be observed that either of the twin tires may be removed from the brackets B for replacement or repair without disturbing the other tire.

*Mode of operation.*

When the substitution of twin tires for a single tire is desired, the rim carrying the single tire is removed from the wheel A by releasing the bolt 9. The carrier comprising annulus E and its brackets B having been equipped with the rims C and D and tires C' and D', is then placed in position upon the wheel A, and locked in place by means of the wedge 8 and bolt 9. This substitution of double tires for the single tire, or, reversely, again substituting a single tire for the double tires is accomplished solely by the necessary manipulation of the bolts 9.

Many variations of structure from the embodiment of my invention shown in the drawings may be accomplished without departure from my invention as defined in the appended claims.

It should be understood that a plurality of the brackets B and the accompanying parts 9, 16, 17, 18 and 20 is employed in the wheel of my invention, in such number as the size of the wheel and weight of the load to be carried may indicate. Also that the words "bottom" and "top" as used in this description and the claims refer to the brackets as illustrated, and to the inner and outer portions of the brackets when mounted on the wheel.

I claim—

1. The improvement in vehicle wheels comprising a series of dual-rim-carrying brackets, each bracket being formed to provide a central chamber having an open-mouthed bottom and side chambers having closed bottoms and open at their tops.

2. The improvement in vehicle wheels comprising a series of equi-distant dual-rim-carrying brackets, each bracket being formed to provide a central chamber having an open-mouthed bottom and side chambers having closed bottoms and open at their tops.

In testimony whereof I have hereunto affixed my signature.

CHRISTIAN J. HUG.